(12) United States Patent
Barua et al.

(10) Patent No.: US 6,898,988 B2
(45) Date of Patent: May 31, 2005

(54) INTEGRATED LOAD CELL SYSTEM

(75) Inventors: Debojit Barua, Troy, MI (US); Diane Marie Jett, Warren, MI (US); Srini G. Naidu, Northville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/062,339

(22) Filed: Jan. 31, 2002

(65) Prior Publication Data

US 2003/0140714 A1 Jul. 31, 2003

(51) Int. Cl.[7] .................................................. G01L 1/04
(52) U.S. Cl. ............................ 73/862.627; 73/862.628; 73/862
(58) Field of Search ............. 73/862, 862.621–862.639; 177/134–136, 144

(56) References Cited

U.S. PATENT DOCUMENTS

| | | | |
|---|---|---|---|
| 4,212,360 A | 7/1980 | Chesher | |
| 5,269,388 A | * 12/1993 | Reichow et al. | ............ 177/144 |
| 5,393,938 A | * 2/1995 | Bumbalough | ............... 177/144 |
| 5,474,327 A | 12/1995 | Schousek | |
| 5,714,695 A | 2/1998 | Bruns | |
| 5,810,392 A | 9/1998 | Gagnon | |
| 5,824,963 A | * 10/1998 | Bruns et al. | ................. 177/136 |
| 5,872,319 A | 2/1999 | Bruns et al. | |
| 5,915,281 A | 6/1999 | Sparks | |
| 5,925,832 A | 7/1999 | Bruns | |
| 5,929,391 A | * 7/1999 | Petrucelli et al. | ....... 73/862.627 |
| 5,942,695 A | 8/1999 | Verma et al. | |
| 6,087,598 A | 7/2000 | Munch | |
| 6,177,639 B1 | * 1/2001 | Feilner | ........................ 177/134 |
| 6,242,701 B1 | * 6/2001 | Breed et al. | ................. 177/144 |

OTHER PUBLICATIONS

"Torsional Sensing Load Cell for Tension and Compression," available on Website of Gage Tek Corporation of Rancho Cordova, California located at http://www.gagetek-.com/loadcells/torsional as of Oct. 20, 2000.

* cited by examiner

Primary Examiner—Edward Lefkowitz
Assistant Examiner—Alandra Ellington
(74) Attorney, Agent, or Firm—Sally J. Brown

(57) ABSTRACT

An integrated loadcell system, having a loadcell body having a leg connected to a spanning member, the leg having a transducer mounted thereto and a housing coupled to the loadcell body forming a wheatstone bridge circuit with the transducer; where an output of the wheatstone bridge circuit is indicative of a load experienced by the loadcell body.

12 Claims, 4 Drawing Sheets

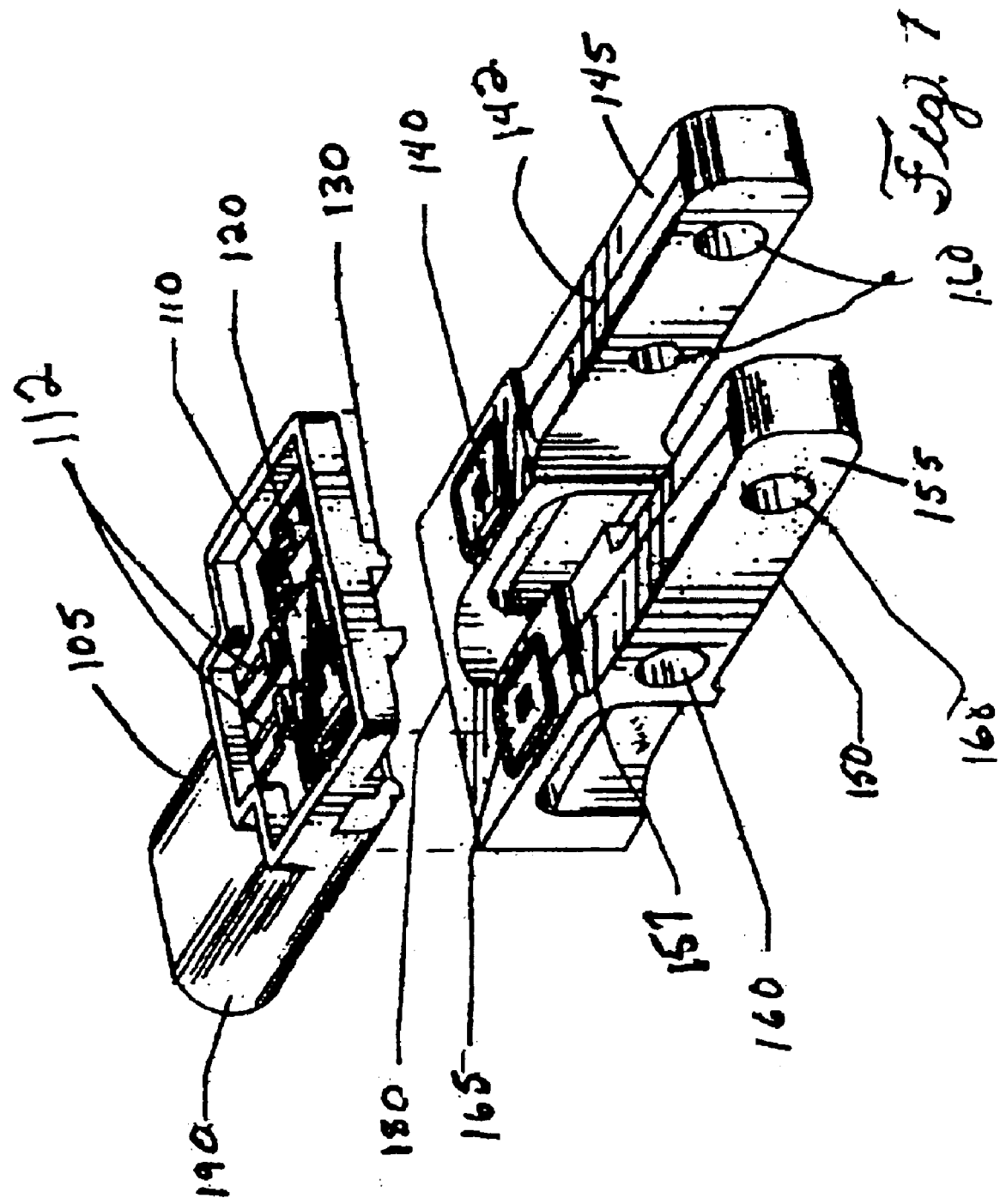

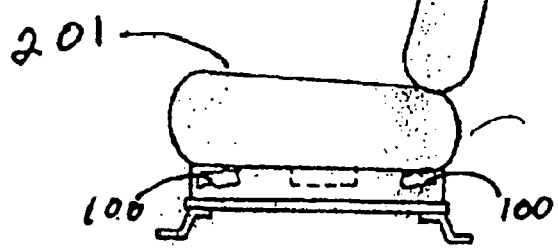
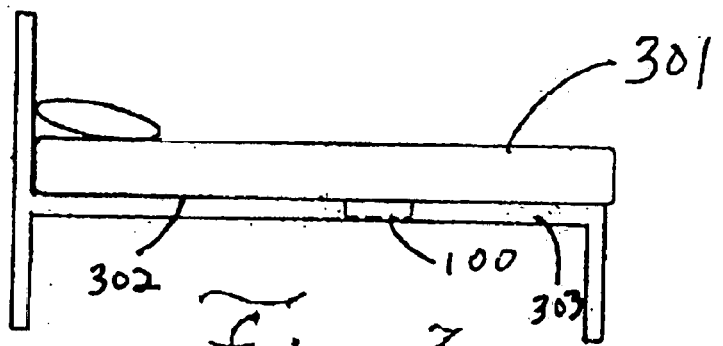
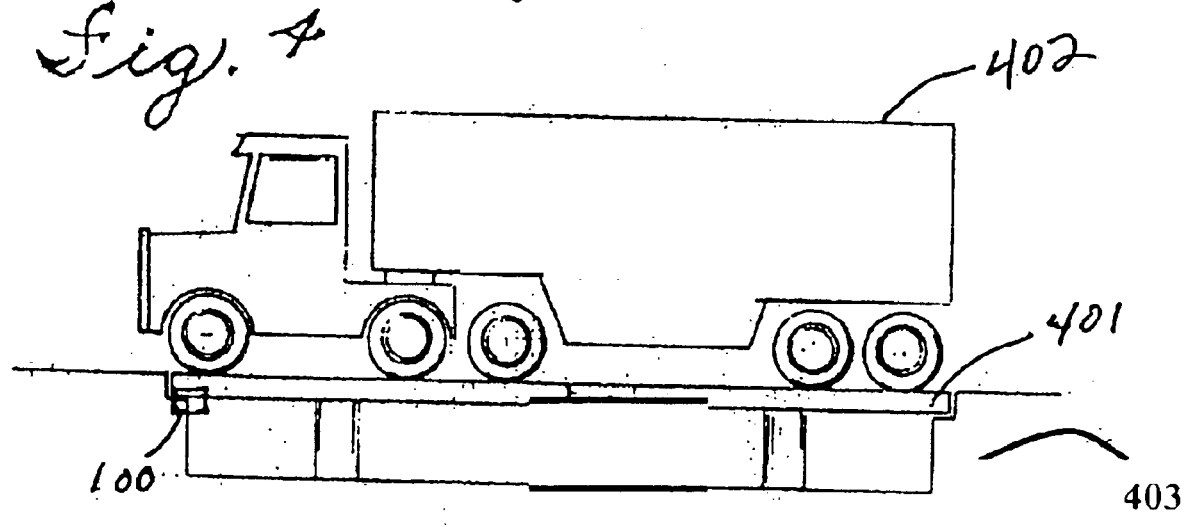

INTEGRATED LOAD CELL SYSTEM

BACKGROUND OF THE INVENTION

1. Field of the Invention

This invention relates generally to loadcells, and more specifically to an integrated loadcell system for accurately classifying an automotive driver/passenger.

2. Related Art

Airbag systems in vehicles often are fashioned to deploy all airbags when a crash occurs. If the passenger seat is empty or contains a child or other small occupant it is desirable to inhibit deployment since the airbag deployment may be useless or even counterproductive. It is thus necessary to accurately classify an automotive driver/passenger.

Loadcells are used to provide accurate measurements of compressive or tensile forces. Typically, the force creates a strain in the loadcell, which is measured by strain gage transducers. Accurate measurements, however, require that the force be applied along an axis, which is central to the load cell and about which all the transducers are symmetrically placed. Also, known loadcells, either with foil type gages or printed resistive inks, are utilized and the electronics are isolated from the sensors resulting in a low signal to noise ratio. Also, due to the inherently low gage factor of these sensors the full-scale output is low.

An example of a loadcell, which is sensitive to the effects of off-axis loading is known as a compression washer. An example of such a loadcell is in a product brochure entitled "Compression Only/Thru Hole Load Washer" and is disclosed in U.S. Pat. No. 4,212,360, the entire contents of which is incorporated herein by reference. An example of strain gauge transducers where the electronics are isolated from the sensors is disclosed in U.S. Pat. No. 5,942,695, the entire contents of which are incorporated herein by reference. Other examples of loadcells are disclosed in U.S. Pat. Nos. 5,714,695, 5,872,319 and 5,925,832, the entire contents of each of which is incorporated herein by reference.

BRIEF SUMMARY OF THE INVENTION

One aspect of the present invention regards an integrated loadcell system having a loadcell body having a leg connected to a spanning member, the leg has a transducer mounted on it, and a housing coupled to the loadcell body forming a wheatstone bridge circuit with the transducer, such that an output of the wheatstone bridge circuit is indicative of a load experienced by the loadcell body.

Another aspect of the present invention regards a seat having a seat pan, a seat rail attached to the seat pan, and an integrated loadcell system. The integrated loadcell system includes a loadcell body having a leg connected to a spanning member. The leg has a transducer mounted on it. The leg is attached to one of the seat pan or the seat rail and a housing attached to the loadcell body forming a wheatstone bridge circuit with the transducer. An output of the wheatstone bridge circuit is indicative of a load experienced by the loadcell body.

Another aspect of the present invention regards a bed having a bed rail, a mattress resting on the bed rail, and an integrated loadcell system. The integrated loadcell system includes a loadcell body having a leg connected to a spanning member. The leg has a transducer mounted on it. The leg is attached to one of the bed rail or the mattress and a housing attached to the loadcell body forming a wheatstone bridge circuit with the transducer. An output of the wheatstone bridge circuit is indicative of a load experienced by the loadcell body.

Another aspect of the present invention regards a scale having a stationary structure, a scale plate resting on the stationary structure, and an integrated loadcell system. The integrated loadcell system includes a loadcell body having a leg connected to a spanning member. The leg has a transducer mounted on it. The leg is attached to one of the stationary structure or the scale plate and a housing attached to the loadcell body forming a wheatstone bridge circuit with the transducer. An output of the wheatstone bridge circuit is indicative of a load experienced by the loadcell body.

Another aspect of the present invention regards an integrated loadcell system having a loadcell body. The loadcell body has a first leg and a second leg. The loadcell body has a first transducer disposed upon the first leg, a second transducer disposed upon the second leg, and a housing coupling the first transducer to the second transducer forming a bridge circuit across each leg. An output of the bridge circuit is indicative of a load experienced by the loadcell body.

BRIEF DESCRIPTION OF THE DRAWINGS

FIG. 1 is a perspective exploded view of an embodiment of an integrated loadcell system in accordance with the present invention;

FIG. 2A is a side view of an embodiment of an automotive seat in accordance with the present invention that employs four of the integrated loadcell systems as shown in FIG. 1;

FIG. 3 is a side view of an embodiment of a bed in accordance with the present invention that employs the integrated loadcell system of FIG. 1;

FIG. 4 is a side view of an embodiment of a scale in accordance with the present invention that employs the integrated loadcell system of FIG. 1.

DETAILED DESCRIPTION OF THE INVENTION

Figure 2B:
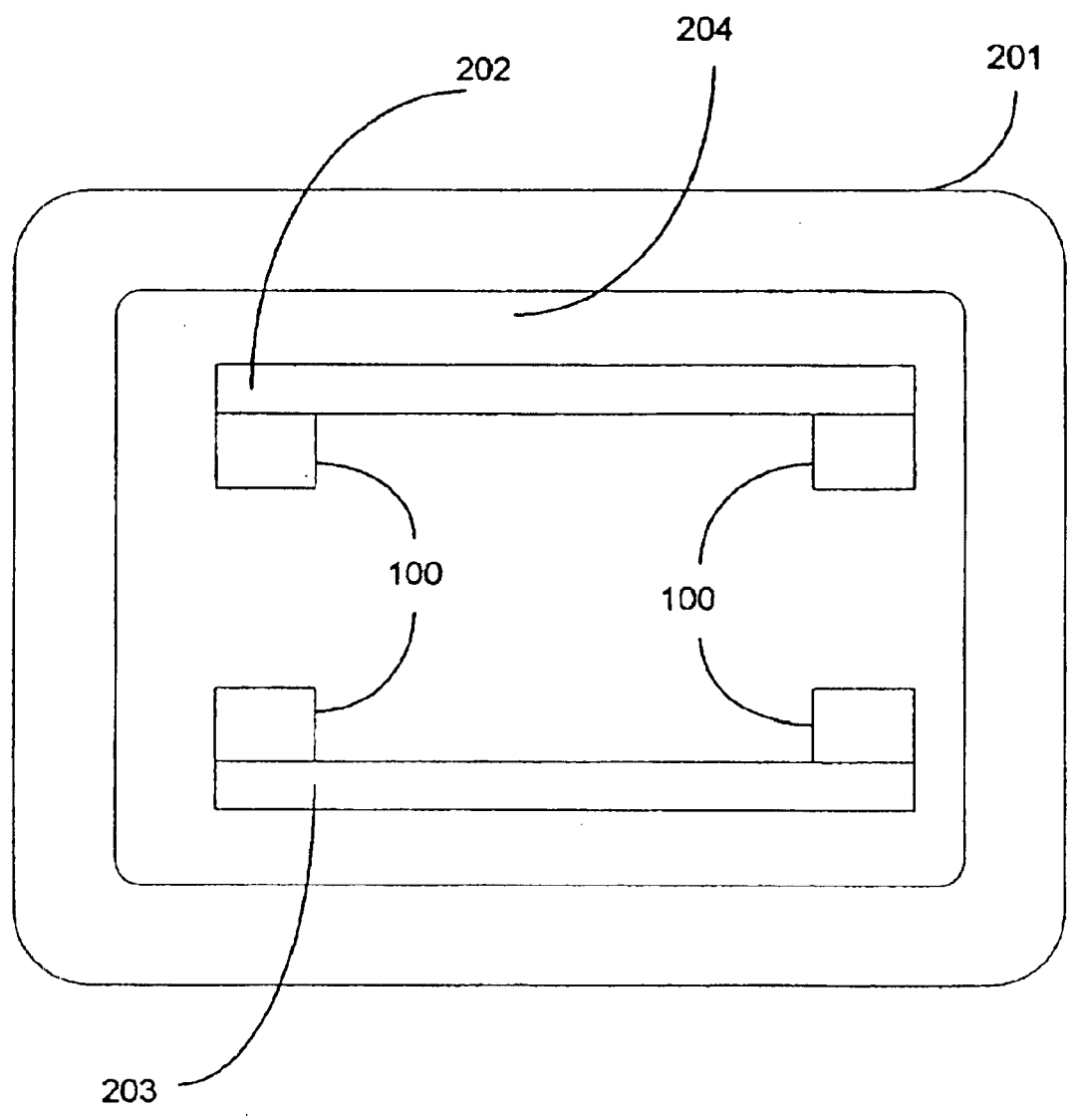
FIG. 2B is a bottom view the automotive seat of FIG. 2A, in accordance with the present invention that employs four of the integrated loadcell systems as shown in FIG. 1.

FIG. 1 shows a perspective view of an integrated loadcell system 100. The integrated loadcell system 100 includes a housing 105 and a loadcell body 150. The loadcell body 150 is manufactured by GageTek Corporation, 11470 Sunrise Gold Circle, Suite 3, Rancho Cordova, Calif. 95742. The housing 105 has an application specific integrated circuit ("ASIC") 110, electro static capacitors 112, a leadframe 120, snap fingers 130 and electrical connector 190. Typically, the housing 105 is made of a molded plastic having an integral connector 190. The electro static capacitors 112 provide electromagnetic interference shielding and are typically reflow soldered to the housing. The loadcell body 150 includes two legs 145, 155 connected to a spanning member 180. Legs 145, 155 each has two silicon piezo resistive transducer (PRT) resistors 140, 165 on a die mounted along a neutral axis 142, 157 of legs 145, 155 respectively and are in a diametrically opposed relationship. The housing 105 is attached to the loadcell body 150 by positioning the snap fingers 130 between the legs 145, 155. The leadframe 120 is then wire bonded to the mounted PRT resistors 140, 165 forming a full wheatstone bridge 117 (FIG. 5) circuit across legs 145, 155.

Figure 5:
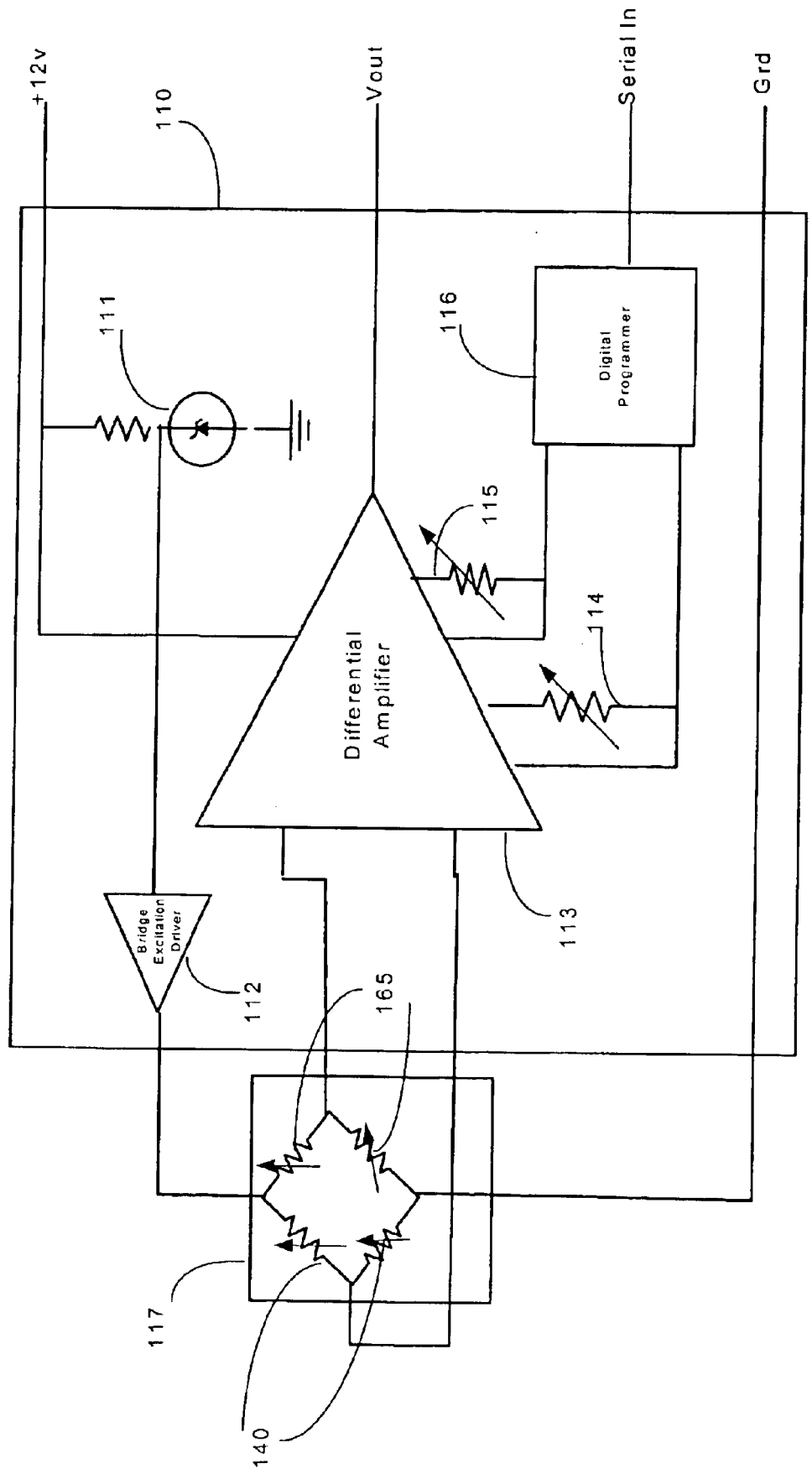
FIG. 5 is of an embodiment of an enlarged view of an application specific integrated circuit (ASIC), in accordance with the present invention.

Referring to FIG. 5, the ASIC 110 has signal processing electronics that receive a signal from the wheatstone bridge 117 circuit and produces a conditioned signal. The ASIC 110 has an on board voltage regulator 111, a bridge excitation driver 112, a differential amplifier 113, a digitally programmable gain 114, a digitally programmable offset 115, and a digital programmer 116. The on board voltage regulator 111 maintains a 5 volt reference voltage to the ASIC 110. The bridge excitation driver 112 provides a constant current or voltage to the wheatstone bridge 117. The differential amplifier 113 receives two low level inputs from the wheatstone bridge 117 and provides an amplified output based on the difference between the two inputs. The digitally programmable gain 114 allows adjustment of the gain from the differential amplifier 113 and is used to ensure that the output of the differential amplifier is maintained within a range of voltage, so that down stream circuits operate. The digitally programmable offset 115 determines a beginning range of voltage for the differential amplifier 113. The digital programmer 116 allows programming of the digitally programmable gain 114 and the digitally programmable offset 115, thus producing the conditioned signal.

Referring once again to FIG. 1, additional details of the integrated loadcell system will be discussed. Consider the loadcell body 150. As can be seen, the loadcell body 150 includes a first leg 145 and a second leg 155, shown in the figure in an enlarged format for clarity. Each of the legs 145, 155 has a PRT resistor 140, 165 mounted upon it. PRT resistor 140 is mounted on leg 145 and PRT resistor 165 is mounted on leg 155. The resistance of the PRT resistors 140, 165 change with an applied force. Silicon PRT is currently a mature technology and utilizes the batch fabrication process of Integrated Circuit (IC) industry.

The integrated loadcell system 100 is mounted using a hard die attachment resulting in maximum sensitivity. The molded plastic housing 105 with integral connector 190 may use molded interconnect technology or an insert molded leadframe. The ASIC 110 and the components mounted on the surface of the housing 105 are reflow soldered on to the housing 105 which is then snap fitted, using the snap fingers 130, onto the load cell body 150. The load cell body 150 may be cast or machined. The leadframe 120 is attached to the PRT resistors 140, 165 by standard methods e.g., wirer bonding, using gold. Finally, the cavity in the housing is filled with soft epoxy and cured for environmental protection. This results in a high volume, simple production process for an integrated loadcell system 100.

Previously, loadcells either with foil type gages or printed resistive inks were utilized and the electronics were isolated from the sensors resulting in low signal to noise ratio. Also, due to the inherently low gage factor of these sensors the full-scale output was low. PRT resistors 140, 165 are inherently high gage factor devices, typically, 5000 times greater than the foil type gages or printed resistive inks discussed previously.

The utilization of the inherent high gage factor of the PRT resistors 140, 165 mounted on the loadcell body 150 using a hard attach (epoxy based) resulting in higher signal to noise ratio leading to accurate and reliable occupant classification. Prior technologies utilized foil type gages (low gage factor) mounted on Kapton/Kovar substrates and was unreliable especially when exposed to electrical noise sources and had a low full-scale output.

FIG. 2A shows an embodiment of the integrated loadcell system 100 fastened to an automotive seat 201 to classify occupant weight resulting in appropriate air bag deployment strategy. FIG. 2B shows a view of a bottom of seat 201 in FIG. 2A. At any two diametrically opposed sections across the loadcell body 150 the sum of the torsional reactive moments is always constant, proportional to the applied load, regardless of where that load is applied. Four integrated loadcell systems 100 are placed at each corner of seat 201. The PRT resistors 140, 165 on a silicon die (shear pairs placed symmetrically on adjacent bridge arms are not responsive to tension or compression) are placed on the neutral axes 142, 157, which eliminates output due to the bending moment, and 90° to each other on each leg 145, 155 of the loadcell body 150 (diametrically opposite) where one of the legs 145, 155 is fastened to a seat pan 204 on the bottom of seat 201, using a fastening hole 160 which transfers the load to the loadcell body 150 and the other legs 145, 155 is fastened to a stationary structure, such as seat rails 202, 203, which is rigidly fastened to the bottom of a vehicle, resulting in the torsional moment in the loadcell body 150 when the seat 201 is occupied by a driver/passenger.

Locating the integrated loadcell systems 100 at each corner of the seat 201 allows determination of the weight of the driver/passenger and location of the center of gravity on the seat 201 of the driver/passenger. By knowing the weight and location of the driver/passenger a proper airbag deployment strategy can be implemented. For example, the airbag can be deployed with the force that depends on the weight a person occupying the seat. If the person were a child then less force would be used than a full weight adult. It is also possible that detection of a child would result in no deployment of the airbag. Similarly, if the person is sitting forward in the seat 201 a lesser force deployment of airbag should also occur. The PRT resistors 140, 165 are connected in a full wheatstone bridge configuration, which is driven by either constant current or constant voltage, so that the output of the PRT resistors 140, 165 is proportional to the shear strain induced due to the torsional moment of drive/passenger load which is signal conditioned using the on board ASIC 110. The conditioned signal is used to determined the deployment strategy of the airbag.

FIG. 3 shows an embodiment of the integrated loadcell system 100 fastened to a bed 301 to determine whether the bed 301 is occupied, such as a hospital bed, baby bed or the like. One leg 145, 155 of the integrated loadcell system 100 is fastened to a the bottom of a mattress 302 resting on a bed rail 303, which transfers the load to the loadcell body 150 and the other leg 145, 155 fastened to a stationary structure, such as the bed rail 303. The integrated loadcell system operates in a manner described above.

FIG. 4 shows an embodiment of the integrated loadcell system 100 fastened to a scale 401 to determine weight of a vehicle 402, such as a truck, automobile or the like. One of the legs 145, 155 of the integrated loadcell system 100 is fastened to a scale plate 401, which transfers the load to the loadcell body 150 and the other leg 145, 155 fastened to a stationary structure 403. The integrated loadcell system operates in a manner described above.

The foregoing description is provided to illustrate the invention, and is not to be construed as a limitation. Numerous additions, substitutions and other changes can be made to the invention without departing from its scope as set forth in the appended claims.

We claim:

1. An integrated loadcell system, comprising:
a loadcell body comprising a leg connected to a spanning member, said leg comprising a transducer mounted thereto; and a housing attached to said loadcell body forming a wheatstone bridge circuit with said transducer, wherein said housing comprises signal processing electronics comprising an application specific integrated circuit, wherein said signal processing electronics receive a signal from said wheatstone bridge circuit and produces a conditioned signal that is used to determine if a bed is occupied; whereby an output of said wheatstone bridge circuit is indicative of a load experienced by said loadcell body.

2. An integrated loadcell system, comprising:

a loadcell body comprising:
- a leg connected to a spanning member, said leg comprising a transducer mounted thereto; and
- a second leg connected to said spanning member wherein said second leg comprises a second transducer mounted thereto, wherein said transducer of said leg is oriented substantially at ninety degrees to said second transducer of said second leg; and a housing attached to said loadcell body forming a wheatstone bridge circuit with said transducer; whereby an output of said wheatstone bridge circuit is indicative of a load experienced by said loadcell body.

3. The integrated loadcell system of claim 2, wherein said housing comprises signal processing electronics that receive a signal from said wheatstone bridge circuit and produces a conditioned signal.

4. The integrated loadcell system of claim 3, wherein said conditioned signal is used to determine the deployment strategy of an automotive airbag.

5. The integrated loadcell system of claim 3, wherein said conditioned signal is used to determine whether a bed is occupied.

6. The integrated loadcell system of claim 3, wherein said conditioned signal is used to determine the weight of a vehicle disposed on a scale.

7. An integrated loadcell system, comprising:

a loadcell body comprising:
- a leg connected to a spanning member, said leg comprising a transducer mounted thereto; and
- a second leg connected to said spanning member wherein said second leg comprises a second transducer mounted thereto; and a housing attached to said loadcell body forming a wheatstone bridge circuit with said transducer, wherein said housing further comprises snap fingers mounted thereto wherein said housing is coupled to said loadcell body by positioning said snap fingers between said leg and said second leg; whereby an output of said wheatstone bridge circuit is indicative of a load experienced by said loadcell body.

8. The integrated loadcell system of claim 7, wherein said transducer comprises a piezo resistive transducer and said second transducer comprises a piezo resistive transducer.

9. The integrated loadcell system of claim 7, wherein said housing comprises signal processing electronics that receive a signal from said wheatstone bridge circuit and produces a conditioned signal.

10. The integrated loadcell system of claim 9, wherein said conditioned signal is used to determine the deployment strategy of an automotive airbag.

11. The integrated loadcell system of claim 9, wherein said conditioned signal is used to determine whether a bed is occupied.

12. The integrated loadeell system of claim 9, wherein said conditioned signal is used to determine the weight of a vehicle disposed on a scale.

* * * * *